US010054056B2

(12) United States Patent
Carrere

(10) Patent No.: US 10,054,056 B2
(45) Date of Patent: Aug. 21, 2018

(54) TURBINE ENGINE COMBUSTION ASSEMBLY WITH A VARIABLE AIR SUPPLY

(71) Applicant: SAFRAN HELICOPTER ENGINES, Bordes (FR)

(72) Inventor: Bernard Joseph Jean Pierre Carrere, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 591 days.

(21) Appl. No.: 14/432,855

(22) PCT Filed: Sep. 17, 2013

(86) PCT No.: PCT/FR2013/052125
§ 371 (c)(1),
(2) Date: Apr. 1, 2015

(87) PCT Pub. No.: WO2014/053724
PCT Pub. Date: Apr. 10, 2014

(65) Prior Publication Data
US 2015/0247459 A1 Sep. 3, 2015

(30) Foreign Application Priority Data
Oct. 1, 2012 (FR) ...................... 12 59288

(51) Int. Cl.
F02C 7/20 (2006.01)
F23R 3/04 (2006.01)
(Continued)

(52) U.S. Cl.
CPC .................. F02C 7/20 (2013.01); F02C 3/04 (2013.01); F02C 7/22 (2013.01); F02C 7/26 (2013.01); F23R 3/045 (2013.01); F23R 3/346 (2013.01)

(58) Field of Classification Search
CPC ...... F02C 7/20; F02C 7/26; F02C 7/22; F02C 3/04; F23R 3/045; F23R 3/346;
(Continued)

(56) References Cited

U.S. PATENT DOCUMENTS 2,813,397 A * 11/1957 Fisher ...................... F23R 3/14
114/20.2
3,048,015 A * 8/1962 Barrelle .................. F02C 7/266
60/39.821
(Continued)

FOREIGN PATENT DOCUMENTS

GB 2 073 400 A 10/1981
JP 2006-010193 A 1/2006

OTHER PUBLICATIONS

International Search Report dated Mar. 18, 2014 in PCT/FR2013/052125 filed Sep. 17, 2013.
(Continued)

Primary Examiner — Jason Newton
(74) Attorney, Agent, or Firm — Oblon, McClelland, Maier & Neustadt, L.L.P.

(57) ABSTRACT

A turbine engine combustion assembly including a casing, a combustion chamber, and at least one fuel injector. The combustion chamber includes an internal wall and an external wall extending one inside the other and connected by an annular chamber base wall. The external wall of the chamber is secured to an annular external wall of the casing. The injector is attached to the annular external wall of the casing and includes a fuel ignition enclosure extending inside the casing successively through openings in the casing wall and in the external wall before opening into the chamber. At least one wall of the ignition enclosure extending between the casing wall and the combustion chamber wall includes at least one air intake port. The external wall of the combustion
(Continued)

chamber is solidly connected to a device for plugging the air intake port according to a thermal expansion state of the combustion chamber.

18 Claims, 7 Drawing Sheets

(51) Int. Cl.
    *F23R 3/34*     (2006.01)
    *F02C 3/04*     (2006.01)
    *F02C 7/22*     (2006.01)
    *F02C 7/26*     (2006.01)

(58) Field of Classification Search
    CPC ...... F23R 3/04; F23R 3/16; F23R 3/20; F23R 3/22; F23D 2207/00; F23D 11/42
    USPC .......................................................... 60/796
    See application file for complete search history.

(56) References Cited

U.S. PATENT DOCUMENTS

| | | | | |
|---|---|---|---|---|
| 4,174,197 A | * | 11/1979 | Leitermann | F01C 21/06 123/41.13 |
| 5,177,956 A | | 1/1993 | Shekleton | |
| 6,382,159 B1 | * | 5/2002 | Shifflette | H01T 13/08 123/169 R |
| 9,441,543 B2 | * | 9/2016 | Koyama | F02C 3/14 |
| 9,765,698 B2 | * | 9/2017 | Bennett | F02C 7/28 |
| 2005/0072163 A1 | * | 4/2005 | Wells | F02C 7/264 60/796 |
| 2009/0235635 A1 | * | 9/2009 | Ryan | F02C 7/264 60/39.821 |
| 2010/0229557 A1 | * | 9/2010 | Matsumoto | F23R 3/34 60/737 |
| 2014/0352323 A1 | * | 12/2014 | Bennett | F02C 7/28 60/799 |
| 2014/0366542 A1 | * | 12/2014 | Teets | F23R 3/286 60/738 |
| 2015/0167555 A1 | * | 6/2015 | Mottet | F01D 25/20 60/39.08 |
| 2015/0260406 A1 | * | 9/2015 | Carrere | F02C 3/14 60/787 |

OTHER PUBLICATIONS

French Preliminary Search Report and Written Opinion dated Apr. 16, 2013 in Patent Application No. 1259288 (with English translation of categories of cited documents).

International Search Report and Written Opinion dated Mar. 18, 2014 in PCT/FR2013/052125 (with English language translation).

\* cited by examiner

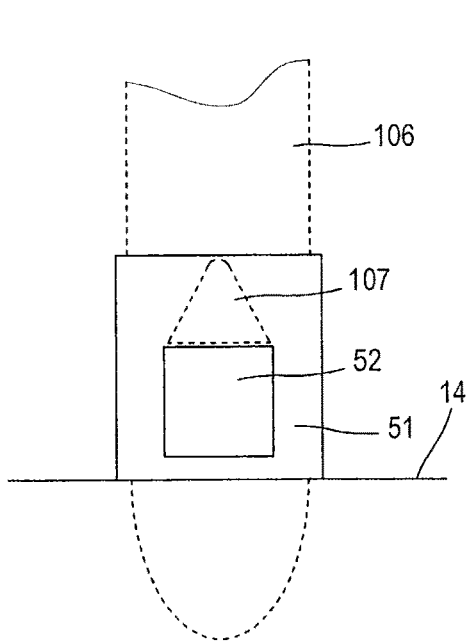
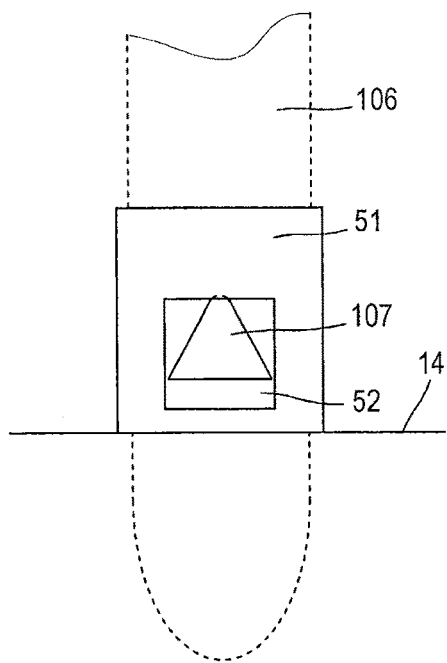
FIG. 7a  FIG. 7b
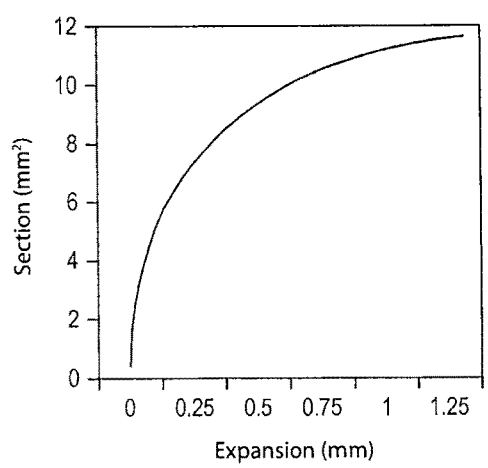
FIG. 7c

TURBINE ENGINE COMBUSTION ASSEMBLY WITH A VARIABLE AIR SUPPLY

FIELD OF THE INVENTION

The invention generally relates to the field of turbine engines, and more particularly the mounting of a fuel injection device on a turbine engine casing and a combustion chamber.

STATE OF THE PRIOR ART

With reference to FIG. 1, turbine engines 1 conventionally comprise a combustion chamber 10 and a distributor 20 housed in a casing 30, the combustion chamber being defined by walls of revolution, namely an external wall 14 and an internal wall 12 extending one inside the other and being connected by an annular chamber bottom wall 16.

The casing also has an internal wall 32 and an external wall 31 to which are respectively secured the internal 12 and external 14 walls of the combustion chamber.

An air and fuel mixture is injected into the combustion chamber via a plurality of injectors 18 mounted on the chamber bottom wall, and distributed over the whole circumference of said wall.

Several types of injectors are arranged in a combustion chamber, among which the starting injectors, which comprise a spray nozzle injecting the air and fuel mixture, and a spark plug igniting said mixture.

To characterise injectors a quantity known as Flow Number (FN) is used, which is equal to the flow rate in L/h of the injector divided by the pressure in bars of the injected mixture. Starting injectors have a Flow Number typically comprised between 1.2 and 1.5.

The other injectors are dedicated to post-starting phases: transitory acceleration or deceleration phases and steady state phases during flight. These injectors have a much higher Flow Number, comprised between 9 and 10, that is to say that their fuel injection flow rate is higher.

Yet, whatever the existing injectors, their air requirement to assure the combustion of the fuel varies according to the phase of the turbine engine.

Notably, at the start-up of the turbine engine, the injectors need to take an important quantity of air to ignite the fuel.

Conversely, during post-starting phases, typically during steady state flight phase, the air requirement is reduced, and it is not useful to take such an important quantity of air as for starting. On the other hand, it is more advantageous to take a smaller quantity of air so that the flow of air not taken by the injectors can serve for other uses, such as in particular cooling of the engine.

GENERAL DESCRIPTION OF THE INVENTION

The aim of the invention is to propose a turbine engine combustion assembly comprising a combustion chamber supplied by fuel injectors, the air supply of which is variable according to the engine phase.

In this respect, the invention relates to a turbine engine combustion assembly, comprising a casing, a combustion chamber, and at least one fuel injector for starting a turbine engine, the combustion chamber being defined by two walls of revolution, namely an internal wall and an external wall extending one inside the other and being connected by an annular chamber bottom wall, the external wall of the chamber being secured to an annular external wall of the casing, the injector being attached to the annular external wall of the casing and comprising a fuel ignition enclosure extending inside the casing successively through an opening in the wall of the casing and an opening in the external wall of the combustion chamber, before opening into said chamber, at least one wall of the ignition enclosure extending between the casing wall and the combustion chamber wall being provided with at least one air intake port, the combustion assembly being characterised in that the external wall of the combustion chamber is solidly connected to a device for plugging the air intake port(s) according to the thermal expansion state of the combustion chamber.

Advantageously, but optionally, the turbine engine according to the invention may further comprise at least one of the following characteristics the plugging device is arranged against the wall of the ignition enclosure and in sliding relationship with same.
 the plugging device is shaped to plug at least certain air intake port(s) at a thermal expansion state called "hot state" of the combustion chamber, corresponding to a post-starting phase of the turbine engine.
 the plugging device is shaped to plug at least certain air intake ports at a thermal expansion state called "cold state" of the combustion chamber, corresponding to a stoppage phase of the turbine engine.
 the device for plugging the air intake port(s) is a sheath surrounding the wall of the ignition enclosure.
 the wall of the ignition enclosure is provided with a triangular air intake port, and the sheath is provided with a rectangular window of width greater than or equal to the base of the triangle and of height greater than or equal to that of the triangle.
 the wall of the ignition enclosure is provided with a plurality of air intake port(s), said ports being circular or oblong, the sheath being provided with slits regularly spaced apart, the interstice between two adjacent slits having a width greater than or equal to the diameter or to the height of the air intake port(s).
 the width of a slit of the sheath is greater than or equal to the diameter or to the height of the air intake port(s).
 the air intake port(s) are circular ports distributed along a plurality of parallel lines on the wall of the ignition enclosure or are oblong parallel vent holes, and the slits and the interstices between two adjacent slits of the sheath extend along a direction parallel to the direction of the lines formed by the ports or the oblong vent holes.
 the air intake port(s) are circular ports distributed along a plurality of parallel lines on the wall of the ignition enclosure or are oblong parallel vent holes, and in which the slits and the interstices between two adjacent slits of the sheath extend along one direction inclined with respect to the direction of the lines formed by the ports or the oblong vent holes, by an angle comprised strictly between 0 and 90°.
 the combustion chamber is of the reverse type.
 each fuel injector is moreover adapted to supply the combustion chamber during a post-starting phase of the turbine engine.

The invention also relates to a turbine engine comprising a combustion assembly according to the invention.

The present invention attains the aforementioned aim thanks to the device for plugging the air intake port(s) of an injector, which moves to plug or to free said ports according to the thermal expansion state of the combustion chamber, corresponding to an operating state of the turbine engine.

DESCRIPTION OF THE FIGURES

Other characteristics, aims and advantages of the invention will become clear from the description that follows, which is purely illustrative and non-limiting, and which should be read in comparison with the appended drawings in which FIG. 1, already described, represents a sectional view of a turbine engine at the level of the combustion chamber.

FIGS. 7*a* and 7*b* schematically represent a variant of the embodiment of FIGS. 6*a* and 6*b*, in two operating states of a turbine engine.

FIG. 7*c* represents the non-plugged section of the exhaust port of FIGS. 7*a* and 7*b* as a function of the expansion state of the turbine engine,

DETAILED DESCRIPTION OF AT LEAST ONE EMBODIMENT OF THE INVENTION

Figure 1:
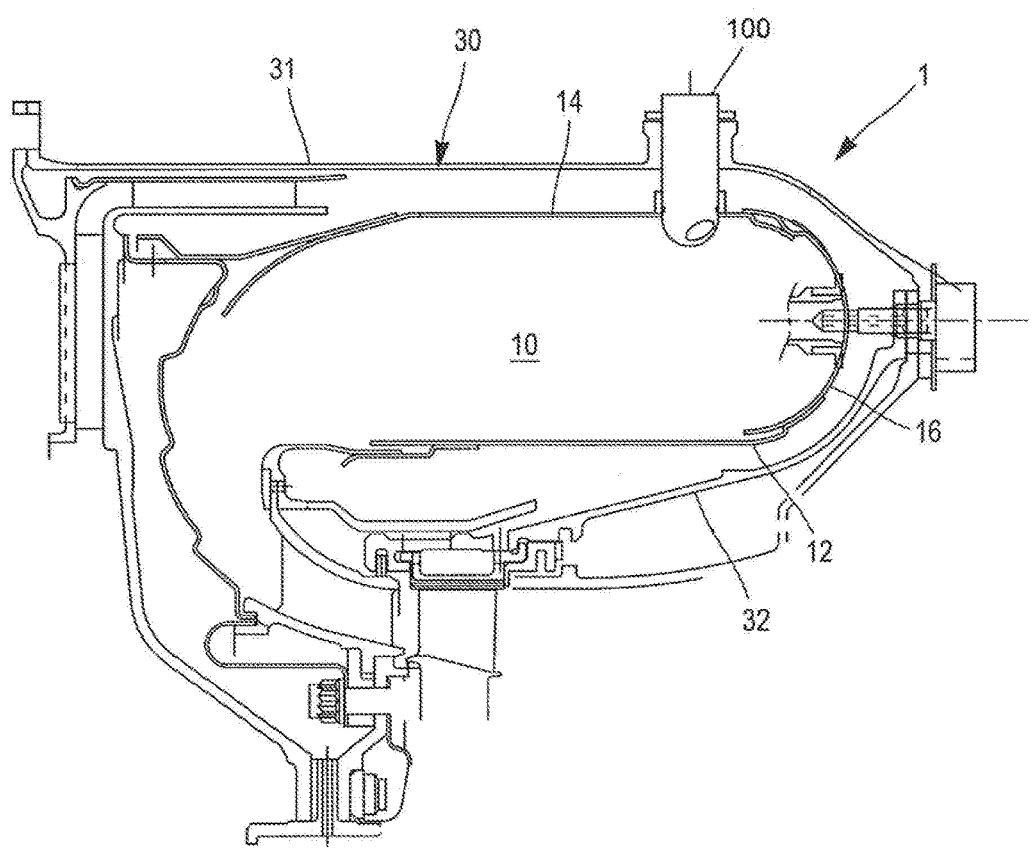

According to FIG. 1 already described, a turbine engine 1 comprises a combustion chamber 10 housed in a casing 30, the combustion chamber being defined by walls of revolution, namely an external wall 14 and an internal wall 12 extending one inside the other and being connected by an annular chamber bottom wall 16.

The casing 30 has an annular internal wall 32 and an annular external wall 31 to which are respectively secured the internal 12 and external 14 walls of the combustion chamber.

The combustion chamber 10 is advantageously of the reverse type, that is to say of the type in which the chamber generally has a U-shaped section for evacuating air and combustion products towards the upstream of the turbine engine with respect to the axis of same, in the direction of a turbine.

The combustion chamber 10 preferably comprises a plurality of starting injectors 100, located as described hereafter at the level of the annular external wall 14 of the combustion chamber.

Figure 2:
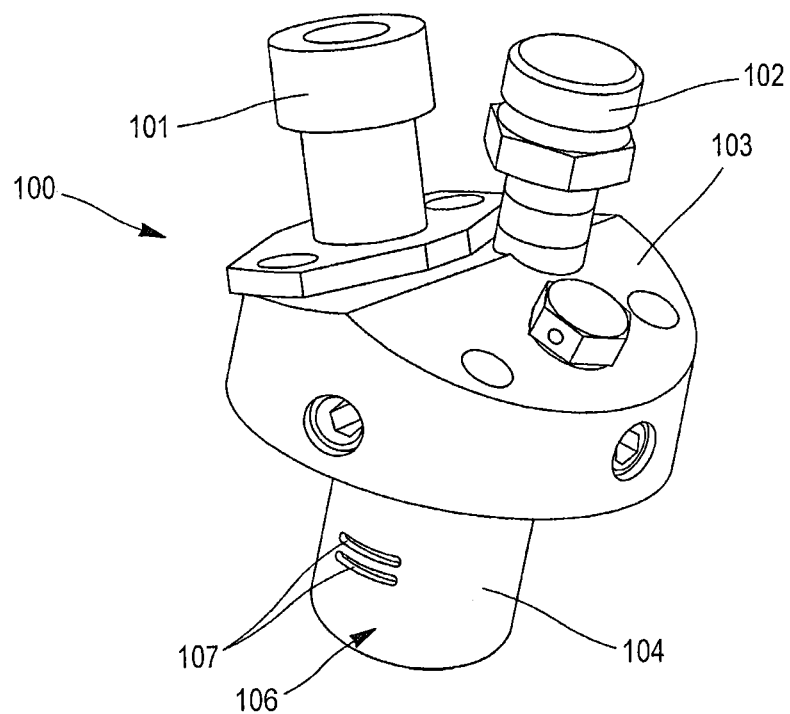
FIG. 2 represents an injector of the type used in a combustion assembly according to the invention.

With reference to FIG. 2, such a starting injector 100 of a combustion chamber has been represented. This injector comprises a spark plug 101 for igniting the fuel, and a fuel supply inlet 102.

The spark plug 101 and the fuel supply inlet 102 penetrate into a cover 103 of the injector, intended to be secured onto the external wall 31 of the casing of a turbine engine.

An enclosure 104, in which takes place the ignition of the fuel before said fuel penetrates into the combustion chamber, extends projecting from the cover 103.

Figure 3A:
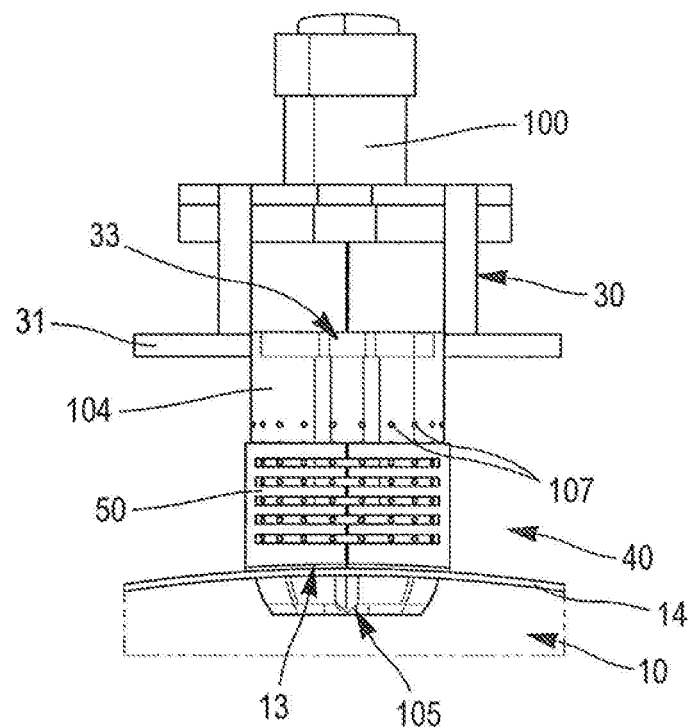
FIGS. 3*a* and 3*b* represent a combustion assembly according to an embodiment of the invention, in two operating states of a turbine engine.
Figure 3B:
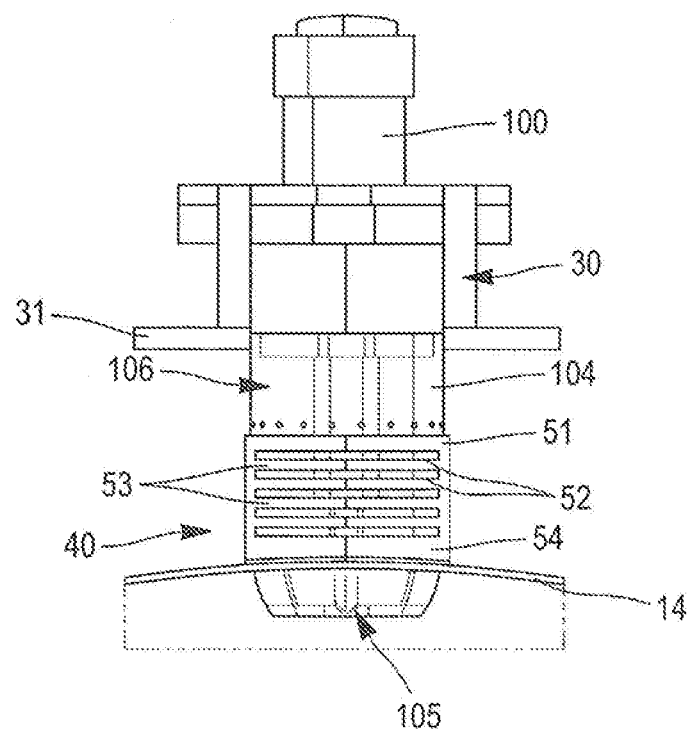

As may be seen in FIGS. 3*a* and 3*b*, the enclosure penetrates into the casing 30 via a port 33 formed in the external wall 31 of same. The enclosure 104 extends into an interstice 40 comprised between the casing 30 and the combustion chamber 10, in which a flow of air may flow during the operation of the turbine engine.

The enclosure also penetrates into the combustion chamber 10 via an opening 13 formed in the external wall 14 of the chamber.

The injector 100 may be formed in different ways that are not the subject of the present invention, but it preferably comprises at least one compartment comprising a fuel injector, and into which penetrates one end of the spark plug, to ignite the fuel. An opening 105 is formed at the base of the enclosure situated inside the combustion chamber (visible in FIGS. 3*a* and 3*b*), to enable the evacuation of the ignited fuel into the combustion chamber.

The injector 100 may according to a particular embodiment comprise, in the enclosure 104, a fuel ignition circuit as previously, and a second circuit, adapted to ignite a higher fuel flow rate, and to supply the combustion chamber of the turbine engine including during the post-starting phases of the chamber.

The enclosure 104 comprises, apart from the exhaust opening 105, on the portion of its wall 106 comprised in the interstice 40, at least one air intake port 107.

Figure 5:
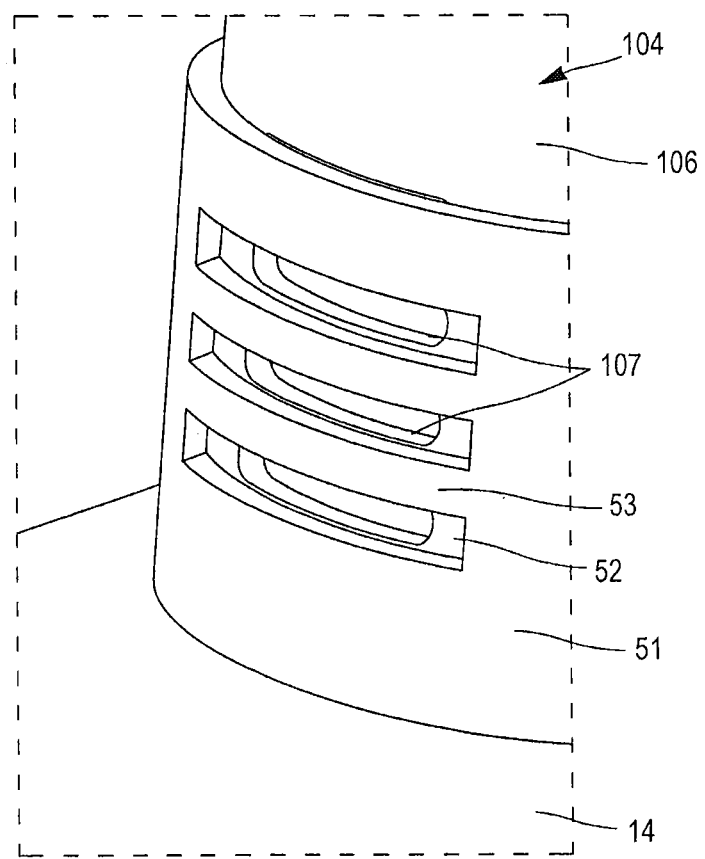
FIG. 5 represents a combustion assembly according to another embodiment of the invention.

The ports may take the shape of oblong vent holes, as in FIG. 2 or FIG. 5, or circular vent holes regularly distributed and aligned along said wall, as may be seen in FIGS. 3*a* and 3*b*.

Alternatively, the wall 106 may bear a single air intake port 107, as illustrated in FIGS. 6*a*, 6*b* and 7*a*, 7*b*, this port having an opening width that is variable with its distance with respect to the external wall 14 of the combustion chamber, for example increasing or decreasing.

Width is taken to mean a dimension measured transversally to the axis along which the enclosure 104 extends. Hereafter, height is taken to mean a dimension measured along said axis.

Figure 6A:
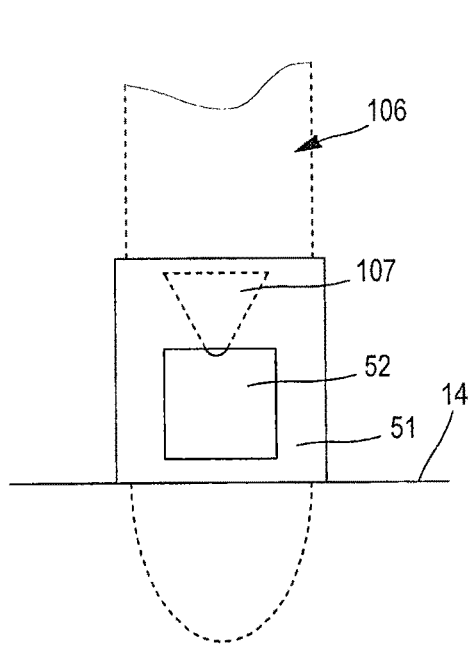
FIGS. 6*a* and 6*b* schematically represent another embodiment of a combustion assembly, in two operating states of a turbine engine.
Figure 6B:
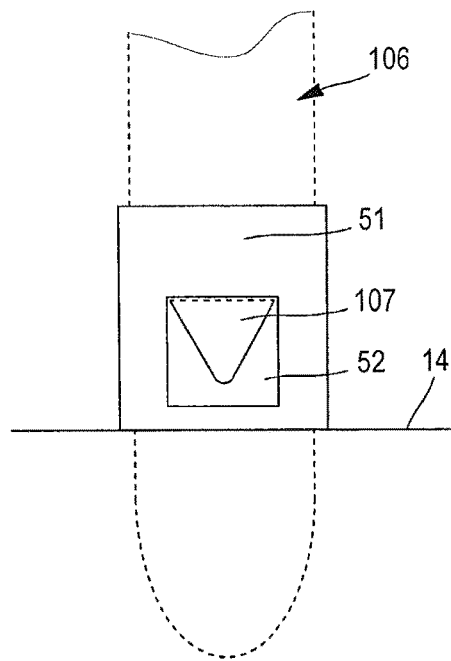

As a non-limiting example, this port may take the shape of a triangle, the top of which is oriented towards the external wall 14 of the combustion chamber, as in FIGS. 6*a* and 6*b*, or the top of which is oriented the opposite way from said wall, as in FIGS. 7*a* and 7*b*.

Returning to FIGS. 3*a* and 3*b*, a device for plugging 50 the port(s) 107 is solidly connected to the external wall 14 of the combustion chamber, and in sliding liaison with respect to the enclosure 104.

It is preferably but in a non-limiting manner attached to the external wall 14 of the combustion chamber, on the perimeter of the opening 13 made in the same to receive the base of the enclosure 104. Alternatively, the plugging device may be integrally formed with the wall 14 of the combustion chamber.

The plugging device 50 is preferably a sheath 51 projecting from the wall 14 of the combustion chamber to the external casing wall 31, and surrounding the enclosure 104 while being in contact therewith over a portion of its wall 106 comprised in the interstice 40.

The sheath further comprises at least one slit, preferably a plurality of slits 52 making it possible to free or to plug all or part of the ports 107 of the wall 104.

The sheath may be formed in different ways.

In FIGS. 3a and 3b, the ports 107 of the wall are circular openings aligned along a plurality of parallel lines along the wall of the enclosure. The slits 52 of the sheath may be shaped to completely plug or to free the ports 107 according to the relative positions of the ports 107 and the slits 52.

For example, the slits 52 of the sheath may have an orientation parallel to the alignment of the ports 107, and have a width greater than or equal to the diameter of the ports 107. Thus, as in FIG. 3a, if the slits are opposite the ports, all the ports 107 of a same alignment are open and open out onto the interstice 40.

The interstices 53 between two successive slits 52 of the sheath may also have a width greater than or equal to the diameter of the ports so as to plug completely the ports 107 of a same alignment when the slits 52 are not opposite said ports.

This is the case represented in FIG. 3b.

In an analogous manner, in FIG. 5, the ports 107 of the enclosure 104 may be oblong vent holes, and in this case the slits 52 of the sheath 51 may have at least the same length, as well as the same width, the same spacing and the same orientation as the vent holes 107. This makes it possible as previously to plug or to free at the same time all the slits.

Whether the air intake ports 107 of the enclosure 104 are circular or oblong vent holes, the slits 52 of the sheath may also be inclined with respect to the alignment of the ports or the orientation of the vent holes, so as to plug only a part of said ports even when the slits are opposite the ports.

This makes it possible, for a small movement of the sheath 51, to conserve a higher air flow than if the slits were not inclined.

For example, the slits may be inclined by 0 to 90° with respect to the orientation of the alignment of the ports.

Another embodiment is schematically represented in FIGS. 6a and 6b; the enclosure 104 then comprises a triangular air intake port 107, the top of which is oriented towards the external wall 14 of the combustion chamber.

The slit 52 formed inside the sheath is then a rectangular window, of width greater than or equal to the base of the triangle 107, and of height greater than or equal to that of the triangle. The height of the triangle corresponds advantageously to the maximum translation of the sheath, for example 1.25 mm.

In these FIGS. 7a and 7b, the air intake triangle 107 has a top opposite to the external wall 14 of the combustion chamber, and as previously, the window 52 of the sheath is also rectangular, of height greater than or equal to that of the triangle, and of width greater than or equal to the base of the triangle.

Figure 4A:
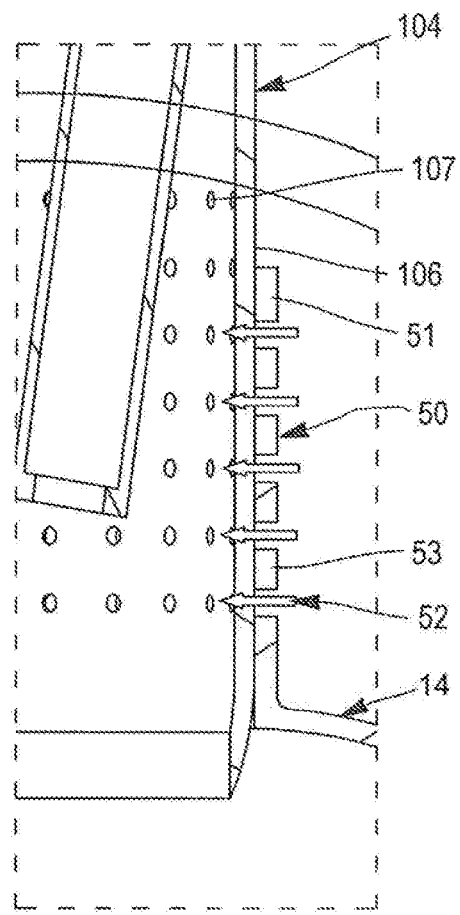
FIGS. 4*a* and 4*b* represent the combustion assembly of FIGS. 3*a* and 3*b*, in transversal sectional view, in two operating states of a turbine engine.
Figure 4B:
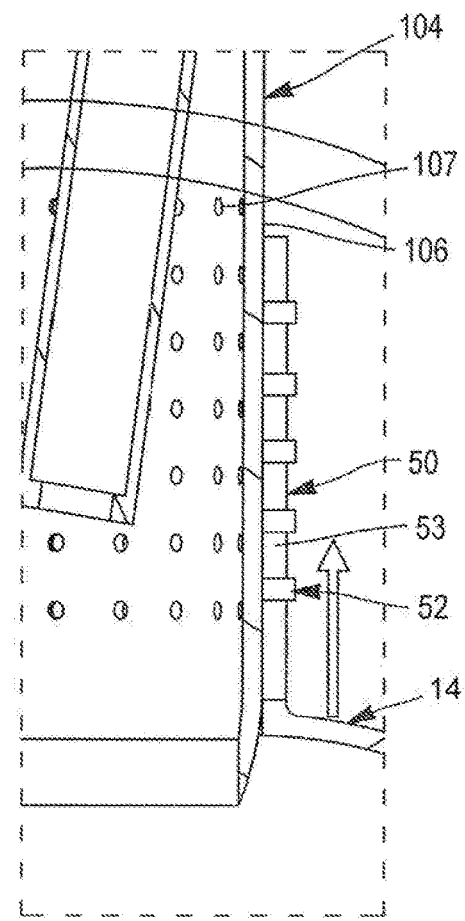

The sliding relationship of the sheath 51 with respect to the enclosure 104 is explained hereafter with reference to FIGS. 4a and 4b. As indicated previously, the sheath 51 is solidly connected to the external wall 14 of the combustion chamber.

This wall is not secured to the enclosure 104, the injector being secured uniquely on the casing, such that it can also move relative to the enclosure 104.

Yet, this wall is subjected to a thermal expansion which is variable according to the operating phases of the combustion chamber. When the turbine engine is stopped, the combustion chamber is in a thermal expansion state called "cold state", the state represented in FIG. 4a.

The starting of the turbine engine, then its operation in post-starting phase (take off, steady state phase, landing) causes heating of the combustion chamber, such that the chamber expands and the wall 14 translates towards the casing.

This thermal expansion state reaches an extreme state called "hot state" during the post-starting phase of the turbine engine, this state being represented in FIG. 4b. At this state, the wall 14 may be translated by a total distance of the order of 1.25 mm towards the casing.

The plugging device 50 being solidly connected to said wall, it also moves in sliding liaison with respect to the enclosure, according to the movement of the wall 14.

Thus, according to the thermal expansion state of the combustion chamber, and the respective geometries of the ports 107 and the slits 52, the relative movement of the plugging device with respect to the wall 14 leads to the plugging or the freeing of all or part of the ports.

Obviously, the air intake port(s) 107 and the slits 52 are dimensioned according to the movement of the sheath generated by the thermal expansion of the combustion chamber. For example, for a movement of 1.25 mm between the "cold" state and the "hot" state, it is possible to provide that the air intake port(s) have a height—in the case of oblong vent holes or of a triangle—or a diameter—in the case of circular ports—less than 1.25 mm, advantageously of the order of 1.25 mm and that the slits 52 and if need be the interstices 53 between them have a width below 1.25 mm, advantageously of the order of 1.25 mm.

The device for plugging air 50, moveable according to the thermal expansion state of the combustion chamber, makes it possible to adjust the quantity of air used to ignite the fuel according to the operating state of the chamber.

In fact, at the starting of the turbine engine, a large quantity of air is generally required to burn a sufficient quantity of fuel to ignite the combustion chamber.

When the turbine engine is in post-starting regime, this air requirement is reduced. Furthermore, it is advantageous to preserve this air for another use, such as for example for cooling the turbine engine.

Thus, it is particularly advantageous to shape the air plugging device 50, so that when "cold" (without thermal expansion), the ports 107 are in a minimum plugging state, for example so that no port is plugged.

In this case, the thermal expansion of the chamber 10 and the change of position of the sheath 51 lead to a reduction in the intake of air by plugging all or part of the ports 107 when the turbine engine operates.

This result may be obtained for example by adjusting the width of the interstice 54 between the wall of the combustion chamber 14 and the first slit 52.

Alternatively, it is possible to envisage for other reasons to shape the air intake device 50 such that the minimum plugging state of the ports 107 corresponds to a "hot" expansion state of the turbine engine.

Figure 6C:
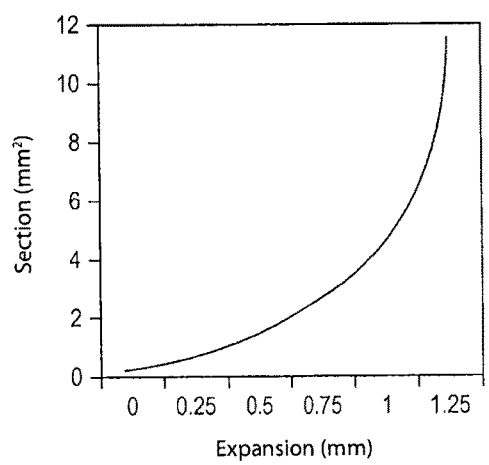
FIG. 6*c* represents the non-plugged section of the exhaust port of FIGS. 6*a* and 6*b* according to the expansion state of the turbine engine.

This is the case represented in FIGS. 6a to 6c, and in FIGS. 7a to 7c.

Furthermore, the desired variation in supply of air between the cold state and the hot state depends on the geometry employed for the air intake ports 107 and the slit(s) 52 of the sheath.

For example, with reference to FIG. 6c, in the cold state, the port 107 is practically completely plugged, and the opening section of the port is thus practically zero. Since the port has a triangular geometry oriented towards the wall 14 of the combustion chamber, the opening section increases proportionally to the square of the movement of the sheath, that is to say firstly very progressively, then more and more rapidly.

In FIG. 7c, conversely, the port 107 has the shape of a triangle oriented the opposite way from the wall 14 of the combustion chamber. The opening section of the port is a polynomial function of the movement of the sheath, and firstly increases rapidly, then in a gentler manner (a same movement of the sheath leads to a lesser increase of the section).

The geometry of the port(s) 107 as well as the slit(s) of the sheath may thus be adapted according to the air requirement needs of the injector.

Finally, it is possible to combine the embodiments described above, to have for example at one and the same time circular ports, ports in the shape of oblong vent holes and/or a triangular port, the geometry of the sheath being adapted to said ports.

A combustion assembly is thus proposed comprising a turbine engine casing in which is housed a combustion chamber, and at least one injector for starting the turbine engine, in which the air supply is variable according to the operating state of the turbine engine.

The invention claimed is:

1. A turbine engine combustion assembly comprising:
a casing;
a combustion chamber;
and at least one fuel injector;
the combustion chamber being defined by two walls of revolution, including an internal wall and an external wall extending one inside the other and being connected by an annular chamber bottom wall, the external wall of the chamber being secured to an annular external wall of the casing;
the at least one fuel injector being attached to the annular external wall of the casing and comprising a fuel ignition enclosure extending inside the casing successively through an opening in the annular external wall of the casing and an opening in the external wall of the combustion chamber, before opening into the combustion chamber, the fuel ignition enclosure including at least one wall that extends between the annular external wall of the casing and the external wall of the combustion chamber and includes at least one air intake port;
the external wall of the combustion chamber being solidly connected to a device for plugging the at least one air intake port according to a thermal expansion state of the combustion chamber.

2. The turbine engine combustion assembly according to claim 1, wherein the device for plugging is arranged against the at least one wall of the fuel ignition enclosure and in sliding relationship with same.

3. The turbine engine combustion assembly according to claim 1, wherein the device for plugging is shaped to plug the at least one air intake port at a thermal expansion hot state of the combustion chamber, corresponding to a post-starting phase of a turbine engine.

4. The turbine engine combustion assembly according to claim 1, wherein the device for plugging is shaped to plug the at least one air intake port at a thermal expansion cold state of the combustion chamber, corresponding to a stoppage phase of a turbine engine.

5. The turbine engine combustion assembly according to claim 1, wherein the device for plugging the at least one air intake port includes a sheath surrounding the at least one wall of the fuel ignition enclosure.

6. The turbine engine combustion assembly according to claim 5, wherein the wall of the ignition enclosure includes a triangular air intake port, and the sheath includes a rectangular window of width greater than or equal to a base of the triangular air intake ort and of height greater than or equal to that of the triangular air intake port.

7. The turbine engine combustion assembly according to claim 5, wherein the at least one air intake t includes a plurality of air intake ports, the ports being circular or oblong, the sheath including slits regularly spaced apart, an interstice between two adjacent slits having a width greater than or equal to a diameter or to a height of one of the plurality of air intake ports.

8. The turbine engine combustion assembly according to claim 7, wherein a width of a slit of the sheath is greater than or equal to the diameter or to the height of one of the plurality of air intake ports.

9. The turbine engine combustion assembly according to claim 7, wherein the plurality of air intake ports are circular ports spread out along a plurality of parallel lines on the wall of the ignition enclosure or are oblong parallel vent holes, and the slits and the interstices between two adjacent slits of the sheath extend along a direction parallel to a direction of the lines formed by the plurality of air intake ports or the oblong parallel vent holes.

10. The turbine engine combustion assembly according to claim 7, wherein the plurality of air intake ports are circular ports spread out along a plurality of parallel lines on the wall of the ignition enclosure or are oblong parallel vent holes, and wherein the slits and the interstices between two adjacent slits of the sheath extend along a direction inclined with respect to a direction of the lines formed by the plurality of air intake ports or oblong parallel vent holes by an angle comprised strictly between 0 and 90°.

11. The turbine engine combustion assembly according to claim 1, wherein each fuel injector is configured to supply the combustion chamber during a post-starting phase of a turbine engine.

12. A turbine engine comprising the combustion assembly according to claim 1.

13. A turbine engine combustion assembly comprising:
a casing;
a combustion chamber; and
at least one fuel injector;
the combustion chamber being defined by two walls of revolution, including an internal wall and an external wall extending one inside the other and being connected by an annular chamber bottom wall, the external wall of the chamber being secured to an annular external wall of the casing;
the at least one fuel injector being attached to the annular external wall of the casing and comprising a fuel ignition enclosure extending inside the casing successively through the opening in an annular external wall of the casing and an opening in the external wall of the combustion chamber, before opening into the combustion chamber, the fuel ignition enclosure including at least one wall that extends between the annular external wall of the casing and the external wall of the combustion chamber and includes at least one air intake port;
the external wall of the combustion chamber being solidly connected to a sheath, the sheath being movable relative to the at least one injector based on a thermal expansion state of the combustion chamber to plug the at least one air intake port.

14. The turbine engine combustion assembly according to claim 13, wherein the sheath is arranged against the at least one wall of the fuel ignition enclosure and in sliding relationship with same.

15. The turbine engine combustion assembly according to claim 13, wherein the sheath is shaped to plug the at least one air intake port at thermal expansion hot state of the combustion chamber, corresponding to a post-starting phase of a turbine engine.

16. The turbine engine combustion assembly according to claim 13, wherein the sheath is shaped to plug the at least one air intake port at a thermal expansion cold state of the combustion chamber, corresponding to a stoppage phase of a turbine engine.

17. The turbine engine combustion assembly according to claim 13, wherein the sheath surrounds the at least one wall of the fuel ignition enclosure.

18. The turbine engine combustion assembly according to claim 13, wherein each fuel injector is configured to supply the combustion chamber during a post-starting phase of a turbine engine.

* * * * *